United States Patent [19]

Tsai et al.

[11] Patent Number: 5,592,159

[45] Date of Patent: Jan. 7, 1997

[54] CONTROL SYSTEM FOR A FLIGHT VEHICLE

[76] Inventors: Yeong-shyeong Tsai; Wang-jr Li, both of No. 141, Fu Hsing Rd., Lu Chou Hsiang, Taipei Hsien; Hong-ming Tsai, No. 2-1, Lane 395, Kuokuang Rd., Taichung; Bo-yu Tsai, No. 2-1, Lane 395, Kuokuang Rd., Taichung; Liu-sing Tsai, No. 2-1, Lane 395, Kuokuang Rd., Taichung, all of Taiwan

[21] Appl. No.: 496,935

[22] Filed: Jun. 30, 1995

[51] Int. Cl.⁶ ........................................ G08G 5/00
[52] U.S. Cl. ................ 340/953; 340/952; 340/947; 340/948; 244/114 R; 244/110 E; 364/427; 364/428; 73/178 T
[58] Field of Search ................. 340/947, 948, 340/952, 953; 244/114 R, 110 R, 110 E; 364/427, 428; 73/178 T

[56] References Cited

U.S. PATENT DOCUMENTS

| 1,392,140 | 9/1921 | Gernsback | 244/110 G |
|---|---|---|---|
| 2,268,320 | 12/1941 | Brandt | 244/114 R |
| 2,355,948 | 8/1944 | Bonstow et al. | 244/114 R |
| 2,371,629 | 3/1945 | Lee | 244/116 R |
| 2,719,214 | 9/1955 | Potter | 340/953 |
| 2,992,330 | 7/1961 | Cooper et al. | 244/114 R |
| 3,544,044 | 12/1970 | Stahmer | 244/114 R |
| 3,771,747 | 11/1973 | Mednikow | 244/114 R |
| 4,196,346 | 4/1980 | McElhannon | 340/953 |
| 4,700,912 | 10/1987 | Corbett | 244/114 R |

*Primary Examiner*—Jeffery Hofsass
*Assistant Examiner*—Benjamin C. Lee
*Attorney, Agent, or Firm*—Welsh & Katz, Ltd.

[57] ABSTRACT

A control system includes at least one guiding device including a long range guiding water jet generator having a plurality of first nozzles each projecting a jet of water upwardly and a first illumination apparatus projecting a plurality of beams of light upwardly each in concert with the jet of water projected from each of the first nozzles so as to guide the flight vehicle along a predetermined direction when the flight vehicle is located at a longer distance relative to the guiding device and a short range guiding water jet generator having a plurality of second nozzles each projecting a jet of water upwardly and a second illumination apparatus projecting a plurality of beams of light upwardly each in concert with the jet of water projected from each of the second nozzles so as to guide the flight vehicle along the predetermined direction when the flight vehicle is located at a shorter distance relative to the guiding device. At least one support water jet generator includes a third nozzle projecting a jet of pressurized water upwardly for supporting the flight vehicle when landing.

4 Claims, 4 Drawing Sheets

Second Communication Apparatus

First Communication Apparatus

Second Communication Apparatus

First Communication Apparatus

CONTROL SYSTEM FOR A FLIGHT VEHICLE

BACKGROUND OF THE INVENTION

1. Field of Invention

The present invention relates to a control system, and more particularly to a control system for a flight vehicle when landing and taking off.

2. Related Prior Art

A conventional guiding system is provided for guiding and directing a flight vehicle along a predetermined travel direction and is not suitable for supporting the flight vehicle smoothly and steadily when landing.

The present invention has arisen to mitigate and/or obviate the disadvantages of the conventional guiding system for a flight vehicle.

SUMMARY OF THE INVENTION

The primary objective of the present invention is to provide a control system for guiding and supporting a flight vehicle to land and take of smoothly and steadily.

In accordance with one aspect of the present invention, there is provided a control system for a flight vehicle when landing and comprising at least one guiding device mounted on the ground for guiding the flight vehicle.

The guiding device comprises a long range guiding water jet generator including a plurality of first nozzles each projecting a jet of water upwardly and a first illumination apparatus projecting a plurality of beams of light upwardly each in concert with the jet of water projected from each of the first nozzles so as to guide the flight vehicle along a predetermined direction when the flight vehicle is located at a longer distance relative to the guiding device and a short range guiding jet bundle generator including a plurality of second nozzles each projecting a spray jet of water upwardly and a second illumination apparatus projecting a plurality of beams of light upwardly each in concert with the jet of water projected from each of the second nozzles so as to guide the flight vehicle along the predetermined direction when the flight vehicle is located at a shorter distance relative to the guiding device.

At least one support water jet generator includes a third nozzle injecting a jet of pressurized water upwardly for supporting the flight vehicle when landing. A supply device is provided for supplying water to the first, second and third nozzles.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
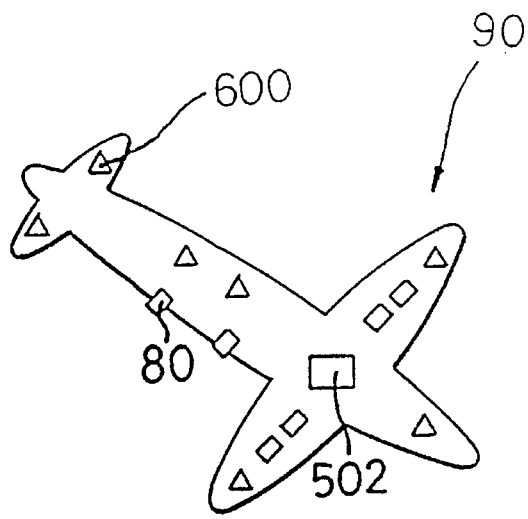
FIG. 1 is a schematic view of a control system in accordance with the present invention.
Figure 1:
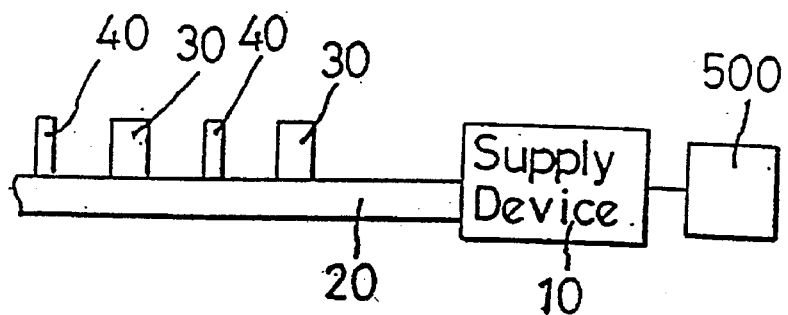

Referring to the drawings, and initially to FIG. 1, a control system in accordance with the present invention is provided for a flight vehicle 90 when landing or taking off and comprises a plurality of guiding devices 40 each mounted on the ground for guiding the flight vehicle 90 and a plurality of support water jet generators 30 for supporting the flight vehicle 90 when landing or taking off. A supply device 10 is connected by means of a conveying tube 20 with the support water jet generators 30 and the guiding devices 40 for supplying pressurized water thereto. A first communication apparatus 500 is connected with the supply device 10 and is in communication with a second communication apparatus 502 which is mounted on the flight vehicle 90.

Figure 3:
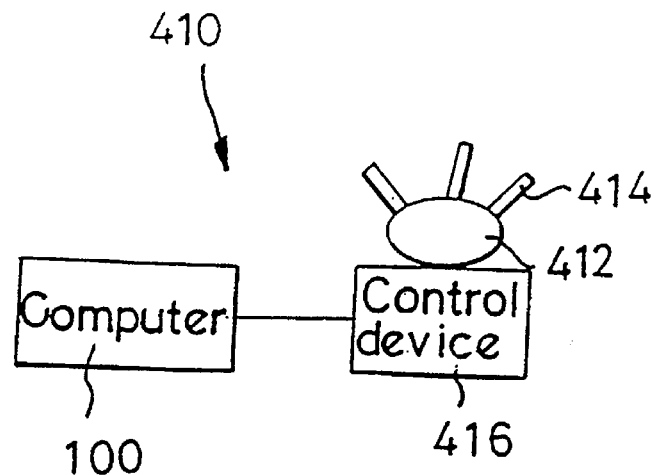
FIG. 3 is a schematic view of a long range guiding water bundle generator.
Figure 4:
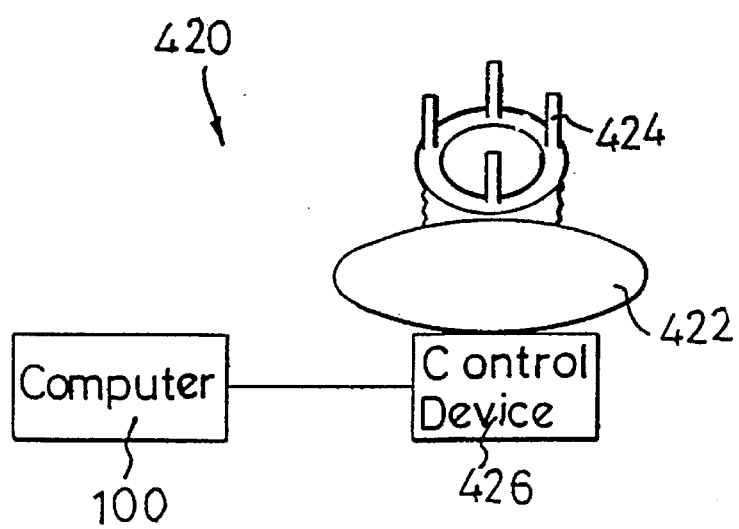
FIG. 4 is a schematic view of a short range guiding water bundle generator.

Referring to FIGS. 3 and 4, each of the guiding devices 40 comprises a long range guiding water jet generator 410 including a plurality of first nozzles 414 each projecting a jet of water upwardly and a first illumination apparatus 412 projecting a plurality of beams of light upwardly each in concert with the jet of water projected from each of the first nozzles 414 so as to guide the flight vehicle 90 along a predetermined direction when the flight vehicle 90 is located at a longer distance relative to the guiding device 40 and a short range guiding water jet generator 420 including a plurality of second nozzles 424 each projecting a jet of water upwardly and a second illumination apparatus 422 projecting a plurality of beams of light upwardly each in concert with the jet of water projected from each of the second nozzles 424 so as to guide the flight vehicle 90 along the predetermined direction when the flight vehicle 90 is located at a shorter distance relative to the guiding device 40.

Control devices 416 and 426 are respectively mounted in the long and short range guiding water jet generators 410 and 420 for controlling the illumination apparatuses 412 and 422. A computer 100 is in communication with the control devices 416 and 426.

Figure 5:
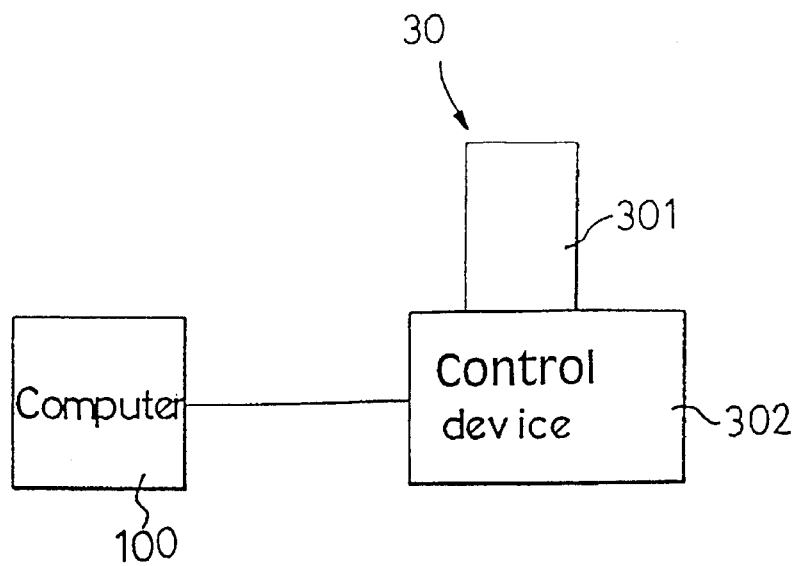
FIG. 5 is a schematic view of a support water bundle generator as shown in FIG. 1.

Referring to FIG. 5, each of the support water jet generators 30 includes a third nozzle 301 injecting a jet of pressurized water upwardly for smoothly supporting the flight vehicle 90 when landing. A control device 302 is mounted on each of the support water jet generators 30 for controlling the amount and the direction of the pressurized water to be projected from the third nozzles 301 to the flight vehicle 90. The computer 100 is in communication with the control device 302.

Figure 2:
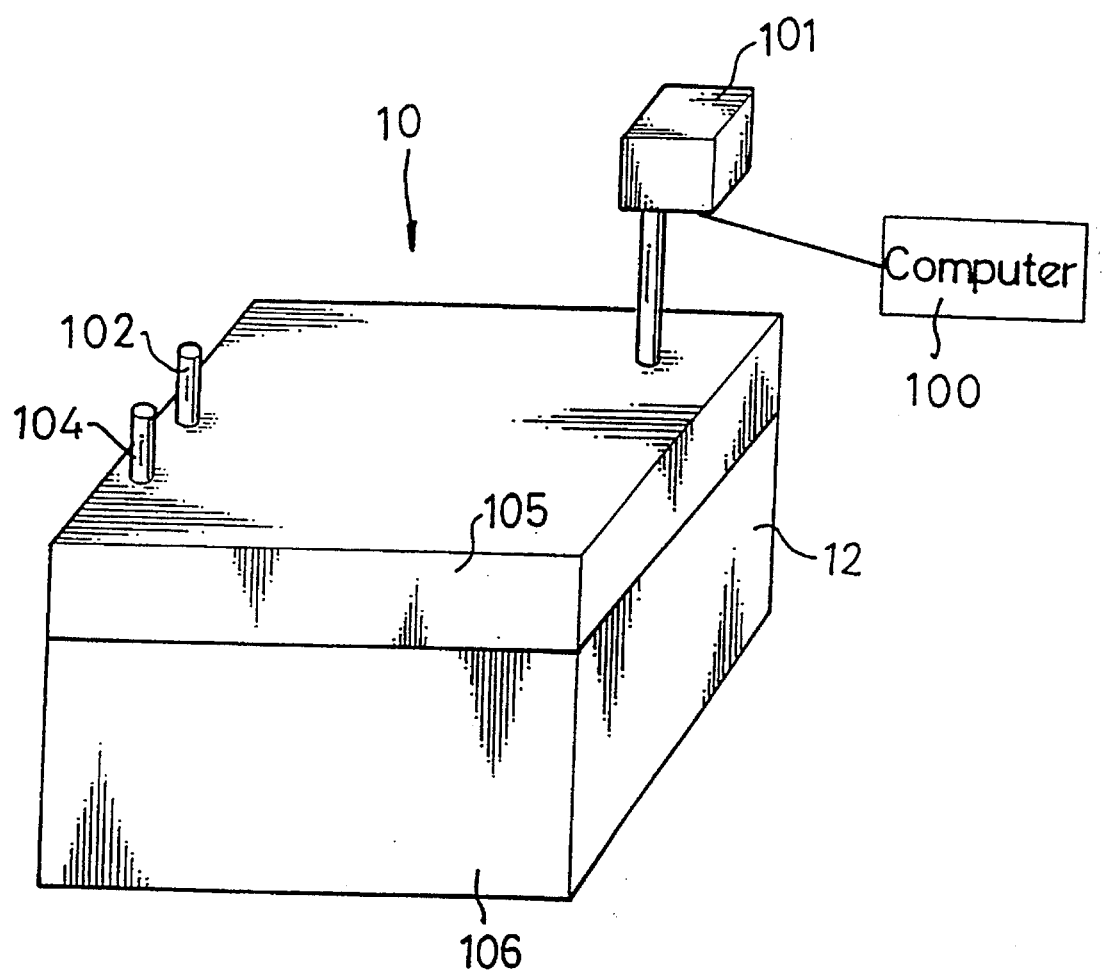
FIG. 2 is a perspective view of a supply device as shown in FIG. 1.

Referring to FIG. 2, the supply device 10 is provided for conveying water to the first, second and third nozzles 414, 424 and 301 (not shown) and comprises a pressure chamber 12 having water 106 and air 105 contained therein. A compressor 101 is mounted on the pressure chamber 12 for pressurizing the air 105 therein so as to compress and urge the water received in the pressure chamber 12 into the first, second and third nozzles 413, 424 and 301 via the conveying tube 20. A display instrument 102 is mounted on the pressure chamber 12 for indicating an instantaneous value of the air pressure therein. A safety device 104 is mounted on the pressure chamber 12 for stopping operation of the compressor 101 when the air pressure in the pressure chamber 12 reaches a predetermined safety value.

Figure 6:
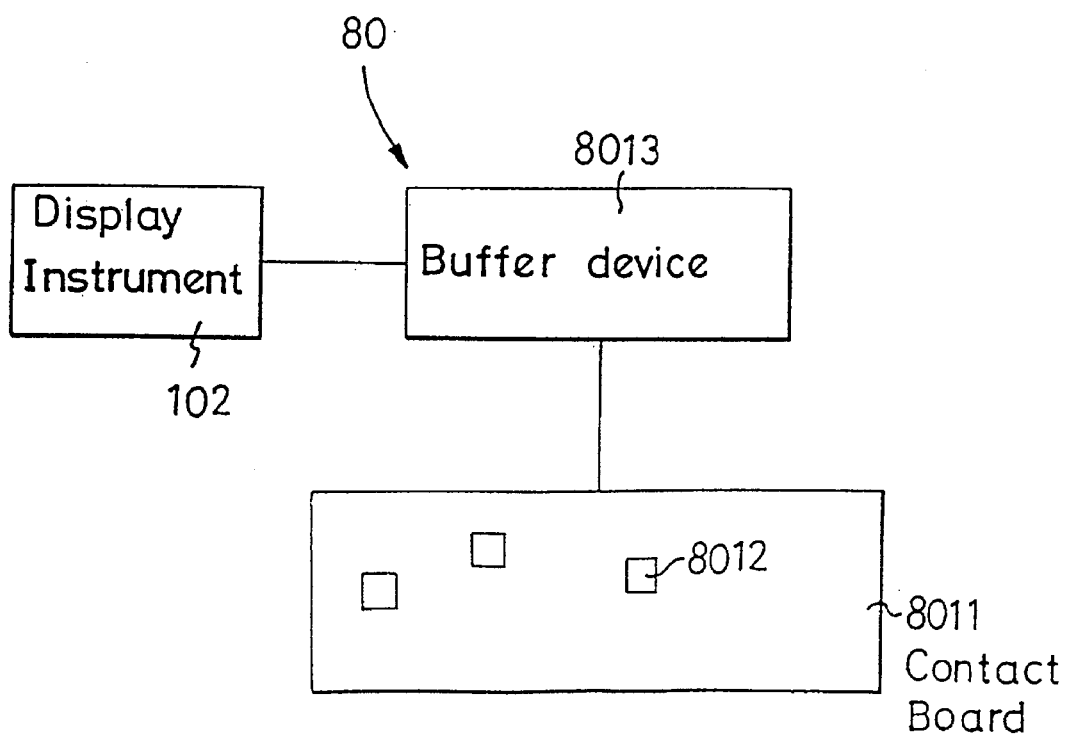
FIG. 6 is a schematic view of a buffer device as shown in FIG. 1.

Referring to FIGS. 1, 3 and 6, a plurality of buffer devices 80 each include a contact board 8011 mounted on an underside of the flight vehicle 90 for being supported by means of the jet of pressurized water projected from the third nozzle 301 of the support water jet generator 30. A plurality of collision sensors 8012 are mounted on each of the contact boards 8011 for sensing an impact force exerted on the contact board 8011 by means of the bundle of pressurized water projected from the third nozzle 301. A plurality of display devices 600 are mounted on the flight vehicle 90 and in communication with the collision sensor 8012 for indicating a current value of the impact force exerted on the contact board 8011.

In operation, an operator on the ground is able to detect an approach of the flight vehicle 90 by means of the communication equipment 500 via the communication equipment 502. Then, the computer 100 is able to operate the long range guiding water jet generator 410 of the guiding device 40 so as to project the jets of water together with bright light upwardly into the high sky in a radiating manner, thereby roughly guiding the flight vehicle 90 along a predetermined travel direction when the flight vehicle 90 is detected to be located at a longer distance relative to the guiding device 40.

When the flight vehicle 90 is detected to be located at a shorter distance relative to the guiding device 40, the computer 100 is able to operate the short range guiding water jet generator 420 of the guiding device 40 so as to inject and project the jets of water together with bright light upwardly into the high sky, thereby precisely guiding the flight vehicle 90 along the predetermined travel direction. Preferably, the beams of light projected from the short range guiding water jet generator 420 are alternated with different colors for facilitating guiding the flight vehicle 90.

When the flight vehicle 90 is about to land on the ground, the computer 100 is able to manipulate the support water jet generators 30 so as to project jets of pressurized water upwardly via nozzles 301 for urging a supporting force on the contact boards 8011, thereby smoothly supporting the flight vehicle 90 so as to land on the ground steadily.

Conversely, when the flight vehicle 90 is about to take off, the computer 100 is able to manipulate the support water jet generators 30 so as to inject jets of pressurized water upwardly via nozzles 301 for urging a supporting force on the contact boards 8011, thereby smoothly supporting the flight vehicle 90 so as to leave the ground steadily.

Accordingly, by such an arrangement, the control system is provided for guiding and supporting the flight vehicle 90 smoothly so as to land or take off steadily.

It should be clear to those skilled in the art that further embodiments of the present invention may be made without departing from the teachings of the present invention.

We claim:

1. A control system for a flight vehicle (90) when landing and comprising:

at least one guiding device (40) mounted on the ground for guiding said flight vehicle (90) and comprising:

a long range guiding water jet generator (410) including a plurality of nozzles (414) each projecting a jet of water upwardly in a radiating manner and an illumination apparatus (412) projecting a plurality of beams of light upwardly in a radiating manner each in concert with the jet of water projected from each of said nozzles (414) of said long range guiding water jet generator (410) so as to guide said flight vehicle (90) along a predetermined direction when said flight vehicle (90) is located at a predetermined distance relative to said guiding device (40);

at least one support water jet generator (30) including a nozzle (301) injecting a jet of pressurized water upwardly for supporting said flight vehicle (90) when landing; and a supply device (10) for supplying water to said nozzles (414) of said long range guiding water jet generator (410) and said nozzle (301) of said support water jet generator (30) respectively.

2. The control system in accordance with claim 1, wherein said support water jet generator (30) further comprises a control member (302) for controlling the amount and direction of the pressurized water to be injected from said nozzles (301).

3. The control system in accordance with claim 1, further comprising at least one buffer device (80) including a contact board (8011) mounted on an underside of said flight vehicle (90) for being supported by means of said jet of pressurized water projected from said nozzle (301) of said support water jet generator (30), at least one collision sensor (8012) mounted on the contact board (8011) for sensing an impact force exerted on said contact board (8011) by means of said jet of pressurized water projected from said nozzle (301) of said support water jet generator (30), at least one display device (600) mounted on said flight vehicle (90) and in communication with said collision sensor (8012) for indicating a value of the impact force exerted on said contact board (8011).

4. The control system in accordance with claim 1, further comprising a short range guiding water jet generator (420) which includes a plurality of nozzles (424) each injecting a jet of water upwardly and an illumination apparatus (422) projecting a plurality of beams of light upwardly each in concert with the jet of water projected from each of said nozzles (424) of said short range guiding water generator (420) so as to guide said flight vehicle (90) along the predetermined direction when said flight vehicle (90) is located at a shorter distance relative to said guiding device (40).

* * * * *